United States Patent [19] [11] 4,430,137
Jones [45] Feb. 7, 1984

[54] PAINT MASK AND METHOD

[75] Inventor: Wallace R. Jones, Waite Hill Village, Ohio

[73] Assignee: The Excello Specialty Company, Cleveland, Ohio

[21] Appl. No.: 500,885

[22] Filed: Jun. 3, 1983

Related U.S. Application Data

[62] Division of Ser. No. 316,925, Oct. 30, 1981, Pat. No. 4,397,261.

[51] Int. Cl.³ ........................ B05C 21/00; B32B 31/18
[52] U.S. Cl. .................................... 156/247; 156/248; 156/253; 156/297; 427/143; 427/282
[58] Field of Search ............... 156/247, 248, 253, 297, 156/344; 427/143, 282; 101/128.21, 128.4; 428/40, 43, 136, 137, 138, 195; 118/505

[56] References Cited

U.S. PATENT DOCUMENTS 2,574,152 11/1951 Lewis et al. .......................... 428/40
3,987,569 10/1976 Chase ................................ 428/41 X

FOREIGN PATENT DOCUMENTS 1243063 6/1967 Fed. Rep. of Germany ........................ 101/128.21

*Primary Examiner*—Alexander S. Thomas
*Attorney, Agent, or Firm*—Fay & Sharpe

[57] ABSTRACT

A paint mask and method for masking a work surface wherein the mask structure is comprised of a first mask layer and a second liner layer. One face of the first layer includes an adhesive coating with the second layer being adhesively secured thereto. A predetermined design configuration is defined in the mask structure by discontinuous cuts extending through both the first and second layers. Score cuts extending through the second layer in spaced apart generally coextensive relationships with the discontinuous cuts define band-like areas. Removal of these band-like areas exposes band areas of adhesive on the first layer which are used to adhesively secure the mask in a desired orientation on a work surface. The discontinuous cuts facilitate removal of that portion of the mask structure disposed on the other side thereof from the score cuts to be removed from covering association wtih the work surface. Pairs of additional score lines may be advantageously included at strategic locations in the second layer to facilitate ease of removal of the band-like areas and/or to increase the amount of exposed adhesive for securing purposes.

6 Claims, 5 Drawing Figures

PAINT MASK AND METHOD

This application is a division of application Ser. No. 316,925, filed 10/30/81 now U.S. Pat. No. 4,397,261

BACKGROUND OF THE INVENTION

This invention pertains to the art of paint masks and, more particularly, to die cut paint masks.

The invention is particularly applicable to such die cut paint masks as employed to accommodate painting of some predetermined design configuration on a work surface and will be described with particular reference thereto. However, it will be appreciated by those skilled in the art that the invention has broader applications and may also be adapted to use in other environments.

Heretofore, conventional die cut paint mask systems have been comprised of three layers of material, i.e., a mask material, a liner paper, and a carrier tape. The mask material comprises an adhesive-coated material which is die cut for having a desired design configuration. The liner paper comprises a coated, heavy paper applied to the adhesive side of the mask material. The liner acts to protect the adhesive and retain the overall mask in an assembled condition during fabrication. The carrier tape is a light adhesive paper applied to the top of the mask material once the mask material has been die cut to the design configuration. This carrier tape functions to hold the mask together after the liner paper has been removed prior to mask application onto the surface to be painted.

Although the foregoing conventional die cut type of paint mask systems have generally provided satisfactory masking results, the necessity for including three layers of material added manufacturing time and costs to the overall systems. Such time and costs become particularly significant and undesirable when a substantial volume of individual products, surfaces, or the like must be identically masked to accommodate the painting of some design configuration thereon.

Accordingly, it has been considered desirable to develop a die cut paint mask system which would eliminate the necessity for three layers of material while still providing the same or superior masking results. The subject invention is considered to meet these needs and others to provide a new and improved system and method which are simple in construction, highly effective in use, and readily adapted to a wide variety of masking applications and environments.

BRIEF DESCRIPTION OF THE INVENTION

In accordance with the present invention, a new and improved paint mask and method are provided which advantageously require only two layers of material for the mask structure. In this structure, a plurality of band-like areas are provided in a liner layer which may be selectively removed for exposing corresponding bands of adhesive on a mask layer. These adhesive bands are adapted to permit adhesively securing the mask structure to a work surface.

More particularly in accordance with the invention, the mask includes a first mask layer having an adhesive on one surface thereof and a second removable liner layer secured to the first layer one surface for defining a laminated type of mask structure. Discontinuous cuts extending through both the first and second layers define some predetermined design configuration while retaining the layers in an interconnected relationship.

Score cuts extending through the second layer adjacent to the discontinuous cuts define first generally band-like areas therebetween. Removal of the first band-like areas exposes corresponding adhesive band areas of the first layer for permitting the mask structure to be adhesively secured to some work surface with the design configuration positioned in a desired orientation. Those portions of the mask first and second layers on the other side of the discontinuous cuts from the score cuts may thereafter be removed from the mask structure to thereby leave a mask of the design configuration on the work surface.

In accordance with another aspect of the invention, the score cuts extend generally parallel to and coextensive with the discontinuous cuts. The spacing between the discontinuous and score cuts is generally in the range of 0.5 inches to 1.0 inches, a distance of approximately 0.75 inches being preferred.

According to another aspect of the invention, the score cuts are located on the mask structure externally of the design configuration for allowing that portion of the mask structure which is not a part of the design to be retained on a work surface while permitting the design configuration portion of the mask structure to be separated along the discontinuous cuts and removed from covering association with the work surface.

According to a further aspect of the invention, the score cuts are disposed on the design configuration portion for allowing it to be retained on a work surface while permitting the remaining portion of the mask structure to be separated therefrom along the discontinuous cuts and removed from covering association with the work surface.

In accordance with a still further aspect of the invention, the second layer includes additional score cuts therethrough at strategic locations on the mask structure. These additional score cuts are disposed in spaced apart pairs for defining second band-like areas therebetween. Removal of these second band-like areas exposes additional adhesive on the first layer adapted to assist in retaining the mask structure on a work surface.

In accordance with still another aspect of the invention, a method is provided for masking an area on a work surface to accommodate painting of a design configuration thereon. Such method entails use of the new and improved mask construction described hereinabove.

The principal object of the present invention is the provision of a new die cut mask and method.

Another object of the invention is the provision of such a mask and method which are simple in construction, easy to install, and effective in practical masking applications.

Still another object of the invention is the provision of a new mask and method readily adapted to use in a wide variety of masking functions in a number of different environments.

Still other objects and advantages for the invention will become apparent to those skilled in the art upon a reading and understanding of the following specification.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF PREFERRED EMBODIMENTS

Figure 1:
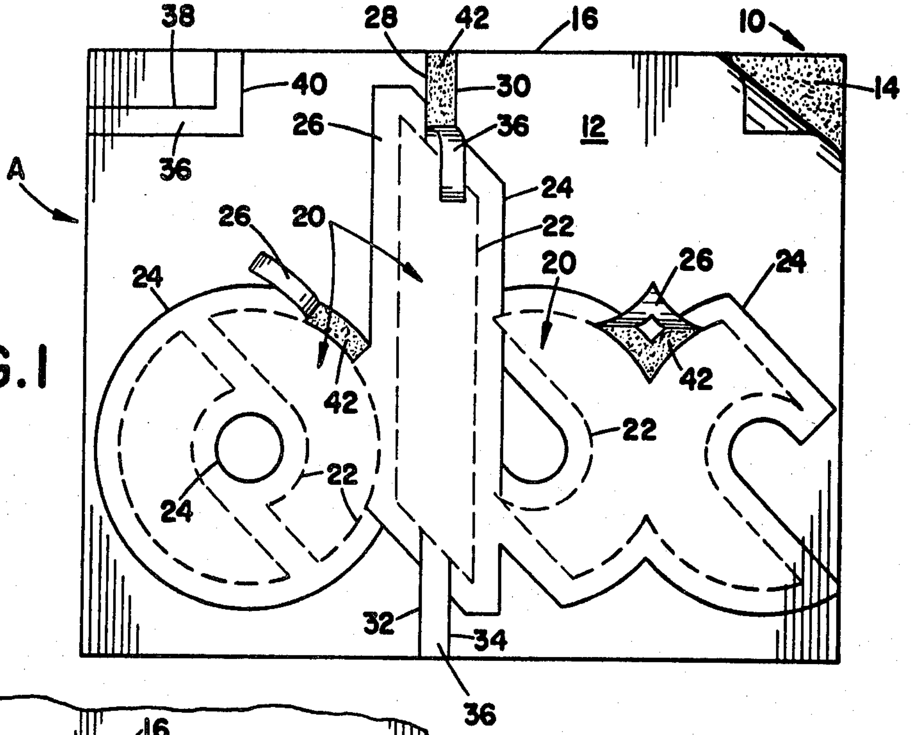
FIG. 1 is a plan view of the subject new mask taken in the direction of the liner layer and with portions of the liner layer pulled back for showing various structural features.

Referring now to the drawings wherein the showings are for purposes of illustrating preferred embodiments of the invention only and not for purposes of limiting same, FIG. 1 shows the subject new die cut mask structure A. While mask structure A is primarily designed and will hereinafter be described as a paint mask, it will be appreciated that the inventive concept could be adapted to use in other environments.

More particularly, and with continued reference to FIG. 1, mask A is a laminated type of structure comprised of a first mask layer 10 and a second liner layer 12. The mask layer may be constructed from most conventional types of mask materials and includes a contact type of adhesive coating 14 over the entirety of one face thereof. Liner layer 12 may also be constructed of a conventional material, typically comprising a coated, heavy paper which is applied to the adhesive side of mask layer 10. Liner layer 12 may, as is also conventional, be selectively removed from the mask layer for exposing contact adhesive 14. The mask structure includes a peripheral outer edge 16 extending therearound. While this peripheral edge takes the form of a rectangle in FIG. 1, it will be readily appreciated that it may take any other form in order to satisfy particular masking requirements.

The overall mask structure includes some predetermined design configuration thereon as generally designated by numeral 20. As shown, this design configuration is comprised of the letters "x", "l", and "o". These letters are shown merely by way of example only, it being appreciated that subject invention may be utilized with any type or style of desired design configuration. More particularly, design configuration 20 is defined by a plurality of discontinuous cuts 22 extending through both of layers 10,12. In the preferred arrangement, these discontinuous cuts comprise perforated cuts having relatively long cut areas alternating with relatively short un-cut areas. The discontinuous cuts retain the mask in an assembled condition to accommodate handling, application, and the like, while allowing selective mask separation in a manner to be described.

A plurality of score cuts 24 extend through second liner layer 12 only and are disposed in a spaced apart relationship with discontinuous cuts 22. As shown in FIG. 1, a score cut 24 extends parallel to and substantially coextensive with each discontinuous cut 22 so that band-like areas 26 of the liner layer material are defined therebetween. Preferably, the lateral spacing between associated ones of cuts 22,24 is generally in the range of 0.5 inches to 1.0 inches, although a distance of approximately 0.75 inches normally is generally preferred. Depending on the overall size of mask structure A and the overall arrangement of design configuration 20, however, it may be necessary and/or desirable to modify the foregoing range of spacing between the cuts. Also, this spacing may vary somewhat at specific areas or portions of design configuration 20 to accommodate specific design details or spacial relationships.

Additional pairs of score cuts generally designated at 28,30 and 32,34 in liner layer 12 extend from peripheral edge 16 of the mask structure to opposite ends of the letter "l" of the design configuration shown. These score cuts define band-like areas 36 and are provided at strategic areas of the mask structure for reasons and purposes which will become apparent hereinafter.

Still further score cuts such as those designated 38,40 may be included in liner layer 12 of the mask structure to better retain the mask on a surface to be painted in a manner to be described. As shown, score cuts 38,40 also define band-like areas 36 and do not communicate with design configuration 20. However, it would be possible to have such communication if desired to better accommodate mask use.

Continuing with reference to FIG. 1, and in order to prepare the mask for application to a work surface, band-like areas 26 included in the mask structure are removed from association therewith. Such removal is effected by first removing band-like areas 36 defined between score cuts 28,30 and 32,34 by a peeling type of action. Since all of score cuts 24, 28, 30, 32, 34, 38, and 40 only extend through liner layer 12, such removal is readily effected without disturbing the integrity of first layer 10 and in particular, adhesive coating 14 thereon. Removal of band-like areas 36 defined between score cuts 28,30 and 32,34 allows the remainder of band-like areas, i.e., areas 26 defined between discontinuous cuts 22 and score cuts 24 to be easily removed from association with the mask structure. Since discontinuous cuts 22 extend through both first and second layers 10,12, the discontinuous nature of the cuts permits band-like areas 26 to be separated from mask structure A at liner layer 12 while design configuration 20 is retained in a connected relationship to mask layer 10. Due to the coated nature of layer 12 and its cooperative relationship with adhesive coating 14, band-like areas 26,36 of layer 12 are easily removed from association with the mask structure by a peeling type of action as shown by the examples included in FIG. 1.

Removal of band-like areas 26,36 thus presents corresponding adhesive bands 42 of adhesive coating 14 which may be advantageously employed to fixedly secure mask structure A to some work surface or member. At the same time, the arrangement allows a portion of the mask structure to be removed from covering association with the work surface while retaining a mask for design configuration 20 thereon.

Figure 2:
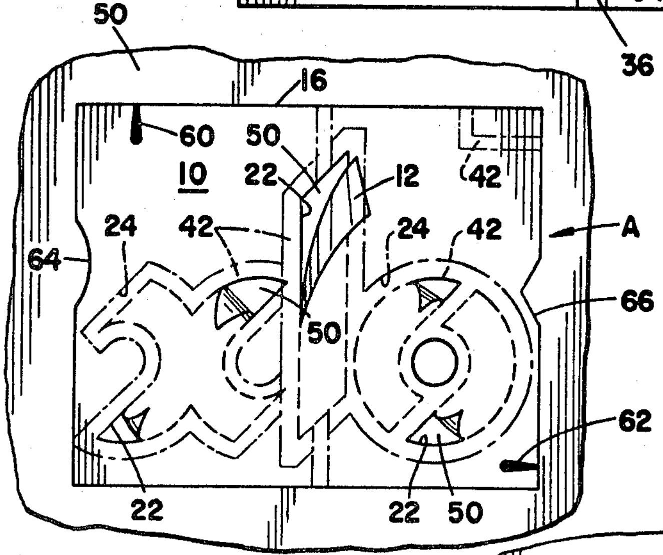
FIG. 2 shows the mask of FIG. 1 mounted on a work surface with the design configuration portion in a partially removed condition.

FIG. 2 shows the mask construction of FIG. 1 after band-like areas 26,36 have been removed and the mask has been installed in a desired orientation on a surface which is to be painted. More particularly, and once paint mask A has been positioned so that design configuration 20 will be properly oriented relative to a work surface or workpiece 50, adhesive bands 42 may be urged into adhesive engagement with the surface for retaining the mask in position. Such adhesive engagement may be effected simply by pressing against the surface of mask layer 10 opposite from adhesive coating 14 at areas thereof corresponding to the adhesive bands. In addition, a tool or other force applying device may also be effectively employed for obtaining good adhesion characteristics between the adhesive and surface 50.

Once the mask is in place, the portion thereof on the other side of discontinuous cuts 22 from score cuts 24 may be removed from association with the mask. In the embodiment here under discussion, this area comprises the letters "x", "l", and "o". The nature of discontinuous cuts 22 allows for ease of such removal, again, in a peeling type of action as shown in FIG. 2.

Figure 3:
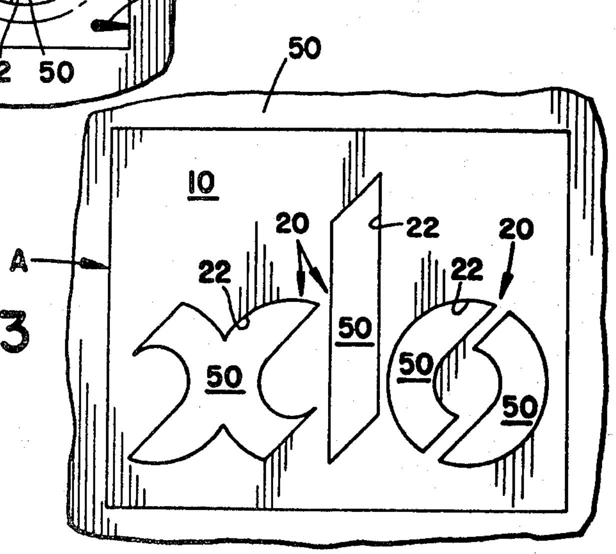
FIG. 3 is a view similar to FIG. 2 with the design configuration entirely removed from association with the mask.

FIG. 3 shows mask A after removal of these areas with surface 50 thus masked in preparation for painting. In the mask arrangement of FIG. 1, it is design configuration 20 which is removed from mask A with the portion of the mask which remains affixed to surface 50 thus providing an outline for the design configuration. In this case, the background area for the design configuration has already been painted on surface 50 prior to affixing mask A thereto. After the mask has been installed as described above, the design configuration as defined by the mask may be painted to the desired color. Following painting as by spraying or the like utilizing conventional techniques, that portion of paint mask A adhesively secured to surface 50 may be removed.

Figure 4:
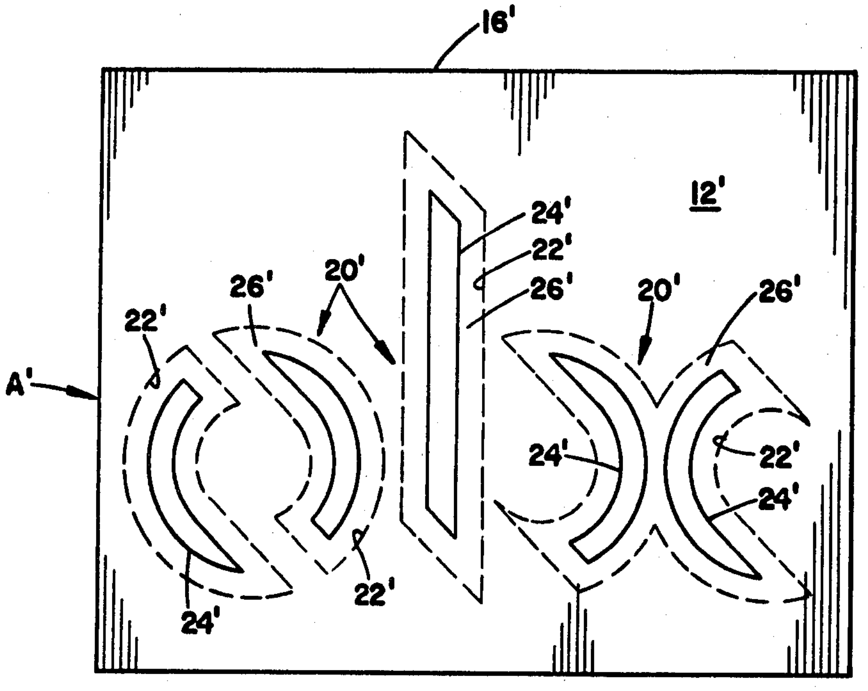
FIG. 4 is a view similar to FIG. 1 showing another preferred construction of the new mask; and, FIG. 5 is a view similar to FIG. 3 showing the mask of FIG. 4 fully installed on a work surface.
Figure 5:
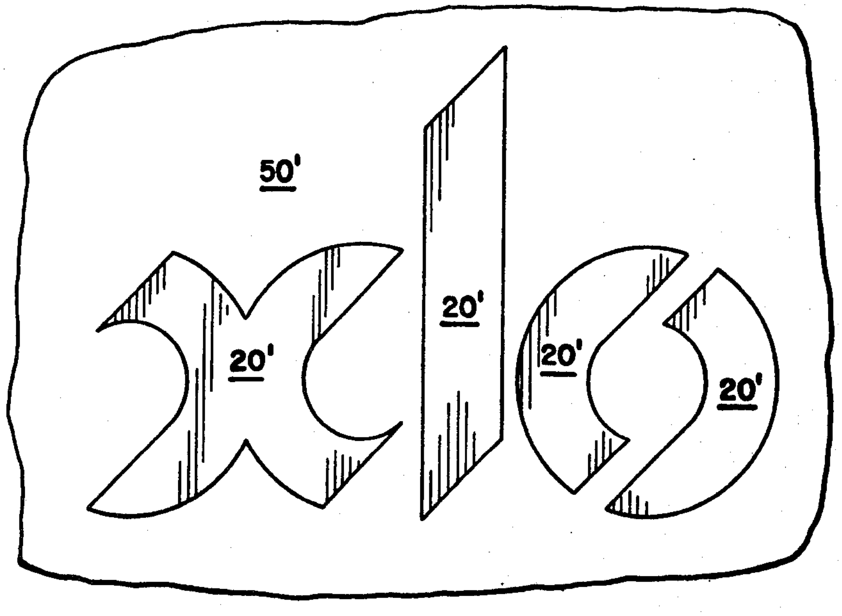

FIGS. 4 and 5 show a slightly modified preferred arrangement which utilizes the same inventive concept hereinabove described. For ease of illustration and appreciation of this modified arrangement, like components are identified by like numerals with a primed (') suffix and new components are identified by new numerals.

More particularly, and with reference to FIG. 4, score cuts 24' are located on the other side of discontinuous cuts 22' from the arrangement shown in FIG. 1. Thus, score cuts 24' are located on that portion of paint mask A' which comprises predetermined design configuration 20'.

When using paint mask A', band-like areas 26' of liner layer 12' are removed from association with the mask structure as hereinabove previously described. When the overall mask structure is thereafter adhesively affixed to a work surface or the like in the same manner as previously described, design configuration 20' is directly affixed to the surface.

With the FIG. 4 embodiment of mask A' affixed to a work surface 50' as shown in FIG. 5, and with the portion of the mask structure which does not include adhesive bands thereon removed from the mask structure at the areas of discontinuous cuts 22' in the same manner described hereinabove, design configuration 20' is retained on work surface 50'. Thus, and as shown in FIG. 5, the letters "x", "l", and "o" are retained in a masking relationship with the work surface. With this embodiment, the general area of work surface 50' which is to be masked is first painted to the color desired in the design configuration. Thereafter, the mask is applied thereover in the manner shown by FIG. 4 so that the background area may be painted to a desired color over the mask of the design configuration. Following this painting, the mask A' may be removed from association with the work surface.

Referring again to FIG. 2, the mask of the subject invention is oftentimes employed in environments where it is desired to have identical placements of the design configuration on a number of separate work surfaces. The typical environment of use for the mask is for masking truck bodies and the like. To accommodate precise location and orientation of the mask and design configuration 20 included therein, it is deemed advantageous to include locating means in mask A. As shown in FIG. 2 only, such locating means may take form of locating indicia 60,62 printed on the outer surface of first layer 10. This indicia may be aligned with predetermined areas of the work surface at the time of mask installation in order that design configuration 20 will be properly oriented. As another alternative, the mask may include predetermined cut out or relieved areas 64,66 which correspond to some contour or configuration on the work surface. By aligning these cut out or relieved areas with the appropriate work surface contour or configuration at mask installation, design configuration 20 may be properly oriented on the work surface.

Since the subject new paint mask A is constructed from thin flexible materials, it is readily usable with contoured work surfaces. This is particularly advantageous when the mask is to be used on, for example, vehicle bodies and the like which all include various contours or shapes in the body panels.

The invention has been described with reference to preferred embodiments. Obviously, modifications and alterations will occur to others upon the reading and understanding of this specification. It is intended to include all such modifications and alterations insofar as they come within the scope of the appended claims or the equivalents thereof.

Having thus described the invention, it is now claimed:

1. A method of masking a predetermined design configuration on a work surface, said method comprising the steps of:

(a) providing a mask structure having a first mask layer including an adhesive on one surface thereof and a second liner layer adhesively secured to said first layer one surface;

(b) defining a predetermined design configuration within said mask structure by means of discontinuous cuts extending through both said first and second layers;

(c) placing score cuts through said second layer in spaced relationship to said discontinuous cuts for defining band-like areas in said second layer between said discontinuous and score cuts;

(d) removing the band-like areas of said second layer for exposing corresponding bands of adhesive therebeneath on said first layer;

(e) affixing said mask structure to a work surface by said adhesive bands with said design configuration disposed in a desired orientation; and, (f) thereafter removing that portion of said mask disposed on the other side of said discontinuous cuts from said score cuts from covering association with the work surface, said step of removing being performed along said discontinuous cuts.

2. The method as defined in claim 1 further including the step of positioning said score cuts in a generally parallel relationship to said discontinuous cuts.

3. The method as defined in claim 1 wherein said step of placing includes locating said score cuts on that portion of said mask structure disposed externally of said design configuration so that during said step of removing the portion of said mask structure not comprising a part of said design configuration will be retained on the work surface.

4. The method as defined in claim 1 wherein said step of placing includes locating said score cuts on that portion of said mask structure which comprises said design configuration so that during said step of removing the portion of said mask structure which defines said design configuration will be retained on a work surface.

5. The method as defined in claim 1 wherein said step of placing includes additional spaced apart pairs of score cuts through said second layer at strategic locations on said mask structure, that portion of said second layer between said additional score cut pairs being removed during said step of removing to expose additional adhesive areas on said first layer for aiding in retaining said mask structure on a work surface during said step of affixing.

6. The method as defined in claim 5 including the step of orienting said additional score cut pairs to communicate between the peripheral edge of said mask structure and said design configuration.

* * * * *